United States Patent [19]

Pate et al.

[11] 4,083,465
[45] * Apr. 11, 1978

[54] RETAINER CLIP AND SYNTHETIC RESIN BOX COMBINATION

[75] Inventors: Harold T. Pate, Cleveland; Richard J. Borsh, Chagrin Falls, both of Ohio

[73] Assignee: Indian Head Inc., New York, N.Y.

[*] Notice: The portion of the term of this patent subsequent to Jul. 19, 1994, has been disclaimed.

[21] Appl. No.: 716,937

[22] Filed: Aug. 23, 1976

Related U.S. Application Data

[63] Continuation-in-part of Ser. No. 607,555, Aug. 25, 1975, Pat. No. 4,036,389.

[51] Int. Cl.² ........................ H02G 3/14; F16B 19/00; F16B 37/02
[52] U.S. Cl. ......................................... 220/3.8; 85/36; 151/41.75
[58] Field of Search ............................... 220/3.2–3.94; 174/53; 85/36; 151/41.73, 41.75; 52/758 F

[56] References Cited

U.S. PATENT DOCUMENTS

| | | | |
|---|---|---|---|
| 3,876,821 | 4/1975 | Pringle | 220/3.2 X |
| 3,895,732 | 7/1975 | Robinson et al. | 220/3.8 X |
| 3,952,475 | 4/1976 | Paskert | 220/3.4 X |

*Primary Examiner*—Stephen Marcus
*Attorney, Agent, or Firm*—William R. Laney

[57] ABSTRACT

A spring fastener or clip of generally V-shaped configuration and including a first, substantially monoplanar leg joined to a second, substantially monoplanar leg through a bend portion so that the legs define between them an acute angle from about 43° to about 48°. The second leg has a circular aperture formed through a central portion, and the first leg has a tongue or tine pressed out of a central portion of the first leg and projecting generally toward the center of the aperture in the second leg, and at an acute angle of from about 22° to about 28° to the plane of the first leg. The tongue projects a distance from the plane of the first leg, as measured normal to that plane, and so as to include the thickness of the first leg, which is from about one-half to about two-thirds of the total distance of projection of the bend portion of the fastener from the plane of the first leg, also as measured normal to the plane of the first leg, and so as to include the thickness thereof.

The invention also includes and relates to fasteners of the type described in combination with a synthetic resin box which has an open side, and which has a cover plate secured across the open side of the box by the use of said fasteners and screws. The box carries a plurality of the fasteners having the first described leg of each pressed into an accommodating slot in the box adjacent the open side thereof. The box further defines an elongated screw-accommodating passageway adjacent each of the slots, and extending parallel to the respective slot and to the first leg of the respective fastener when placed in its respective slot. A second leg of each fastener extends across the respective adjacent screw-accommodating passageway formed in the box, and has the centrally located circular aperture therethrough generally aligned with the screw-accommodating passageway axis, although the center of the circular aperture is slightly offset with respect to the axis of the screw-accommodating passageway axis.

12 Claims, 7 Drawing Figures

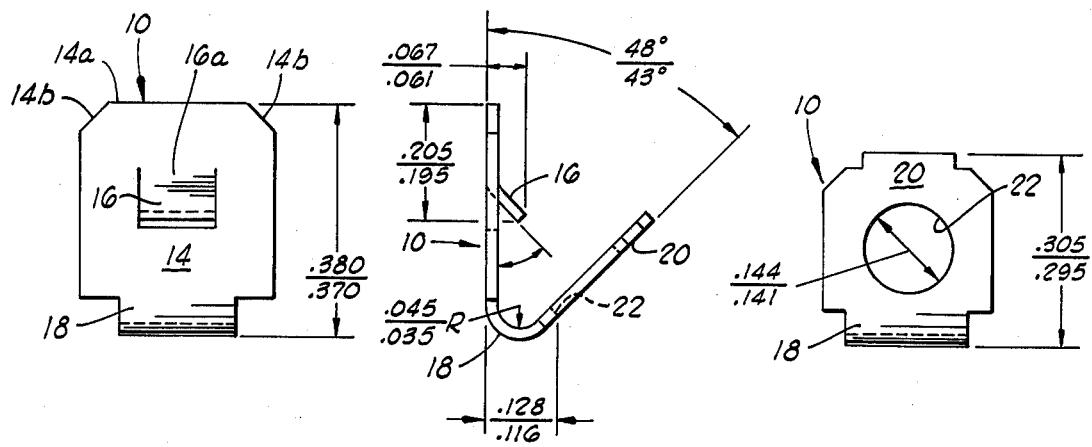
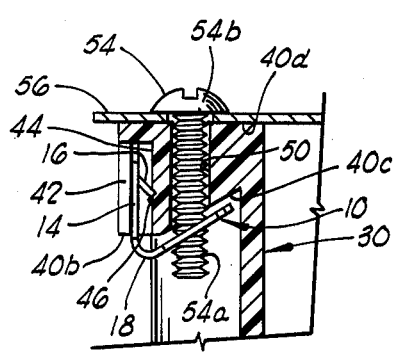
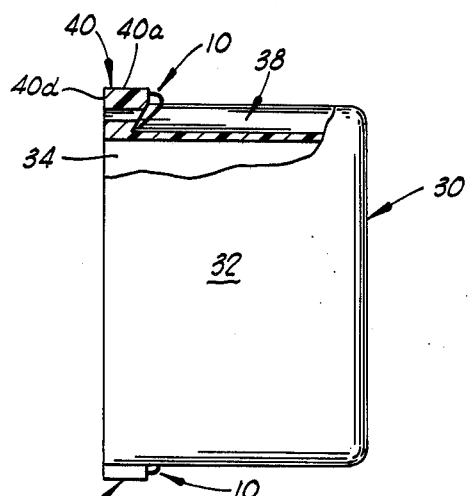
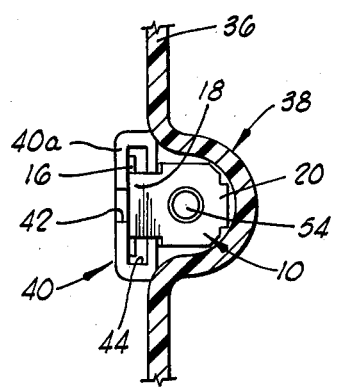
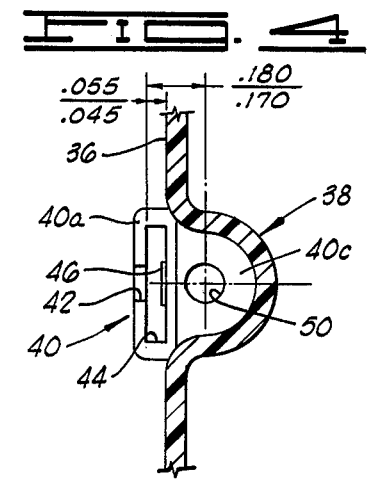

RETAINER CLIP AND SYNTHETIC RESIN BOX COMBINATION

RELATED APPLICATIONS

This application is a continuation-in-part of our U.S. application Ser. No. 607,555 entitled "Retainer Clip and Synthetic Resin Box Combination" filed Aug. 25, 1975 and assigned to the assignee of the present application, said application now issued to U.S. Pat. No. 4,036,389.

BACKGROUND OF THE INVENTION

Field of the Invention

This invention relates to spring metal fastening devices, and more particularly, to fastening devices which are particularly and specifically adapted for use in an open-sided synthetic resin box for the purpose of receiving and retaining screws employed to secure a cover plate across the open side of the box.

Brief Description of the Prior Art

In U.S. patent application Ser. No. 528,007, entitled "Electrical Wall Box," and assigned to the assignee of the present invention, an electrical wall box construction is disclosed in which a synthetic resin electrical wall box is formed to provide slots adjacent an open side of the wall box. Spring metal inserts or clips are pressed into these slots, and function to receive and engage machine screws having threaded shanks of relatively uniform diameter and employed for the purpose of securing a cover plate over the open side of the electrical wall box. The spring metal inserts or clips utilized are of generally V-shaped configuration, and each has a pair of divergent legs which are joined through a bend so that the legs define an acute angle between them. One of the legs has a circular aperture formed in the center thereof for the purpose of receiving one of the screws, and the other leg of each clip has a tongue or tine pressed out of the central portion thereof, and extending toward the leg which carries the circular aperture. The leg carrying the tongue has a pair of lateral edge skirts of flanges which are bent out of the main plane of this leg of the spring metal insert. These edge skirts or flanges function to assist in wedging this leg of the insert or clip into the receiving slot formed in the synthetic resin box.

The metal insert or fastener illustrated and described in the co-pending application is further constructed so that the tongue which is pressed out of one leg of the V-shaped metal insert projects toward the other leg of the insert by a distance which is from about three-fourths to slightly more than equal to the distance measured across the bent connecting portion utilized to connect the two legs of the insert to each other. Stated differently, the tongue pressed out of the one leg of the metal insert or fastener projects a distance from the major plane of this one leg, as measured normal to this plane, which is always at least two-thirds of the distance which the leg-connecting bend portion of the insert projects from the major plane of this one leg, also as measured in a direction normal to this major plane.

In the course of using the described spring metal inserts or fasteners in electrical wall boxes having an open side, and for the purpose of engaging and retaining screws extended through the aperture formed in one of the legs of such inserts, it has been found that two failures of the insert to achieve and properly accomplish its intended function occur with an undesirably high degree of frequency. In one type of failure, attempts to insert the screw through the cover plate and through a portion of the box defining a screw-accommodating passageway and finally through the circular aperture formed through one leg of the spring metal clip or fastener result in the insert or fastener being pushed completely out of its retaining slot so as to be released or disconnected entirely from the box. In the other type of failure, as the tip of the screw approaches the hole or aperture-containing leg of the insert during assembly, the tip of the screw contacts this leg at one side of the aperture or hole, and then, instead of slipping through the hole with a subsequent ratcheting action, continues to bend or deform the apertured leg until it is straightened out and exceeds its limit of elastic deformation so that the leg does not properly engage the threads of the screw, and the insert or fastener does not function to effect the desired and necessary screw engagement.

It has been determined from extensive testing and observation of the metal inserts or fasteners constructed in accordance with the disclosure in co-pending application Serial Number 607,555, that the pushing out of the insert or clip from its frictionally retained position in the slot formed in the box to receive one leg thereof appears to be largely due to several factors. First, such slot is normally characterized in having an intersecting and communicating relief or slot formed along one side thereof in a wall at that particular one side of the leg-receiving slot. The communicating slit formed at right angles to the leg-receiving slot weakens this side wall and permits it to yield or bulge when forced outwardly with respect to the leg-retaining slot. The tine or tongue which projects out of the leg of the insert or fastener inserted in this slot, in the types of clips depicted and described in the cited co-pending application, according to tests, apparently has a stiffness and an overall length of projection from the plane of this leg such that it functions to force the leg from which it is pressed away from the opposite side of the slot receiving this leg as the outer end of the tongue or tine bears against such opposite side, thus distorting the slitted side of the slot, enlarging the slot and causing a looseness of the clip within the slot to develop. In other words, the pressure developed by the tongue-bearing leg upon the synthetic resin defining one wall of the slot which receives this leg tends to distort the resin after the insert has been in the slot for a very short time, with the result that the metal insert becomes relatively loose in the slot. It is therefore relatively easily forced out of the slot when a screw is brought to bear against the other leg of the insert or fastener tending to displace the insert or fastener outwardly.

Another factor in the construction of the described clip which appears to contribute to the type of failure in which the clip is pushed out of its retaining slot is the formation of lateral edge skirts or flanges which are bent out of the major plane of the tongue-carrying leg of the insert or fastener along lines which extend parallel to the axis of the slot into which this leg is inserted. This crimping or bending along these lines forming the described flanges or skirts appears to have some work hardening effect upon the tine or tongue which is pressed out of this leg, making it stiffer and less able to yield or flex, thus further aggravating the enlargement of the fastener-receiving slot by distortion of the plastic. The crimping or bending action along the lines described to form the skirts or flanges also appears to effect work hardening at the major bend by which the two legs of the insert or fastener are interconnected. This latter action contributes to the stiffness of the apertured leg, or its inability to flex in elastic deformation, and this also contributes to the straightening out of the screw-receiving leg in the second type of fastener failure previously described.

BRIEF DESCRIPTION OF THE PRESENT INVENTION

After hundreds of tests of the spring metal insert or fastener described in the cited co-pending application, and repeated efforts by variation of a number of parameters and characteristics of the insert or fastener to reduce the failure rate or inability of the fastener to function properly, we have determined that certain key and critical changes in the geometry and dimensions of the described spring metal insert or fastener will enable the percentage of failures experienced with the described previously known insert or fastener to be reduced from about ten percent (based upon the number of times the clip failed in use) to substantially less than two percent.

The present invention provides an improved spring metal fastener or clip for use in synthetic resin containers or boxes which are open at one side thereof, and which are intended, in use, to be closed at this side by the fastening of a cover plate to the box by the use of machine screws, or other externally threaded fastening members having an elongated shank of substantially uniform diameter. The fastener or clip of the invention exhibits better retention capability in slots formed in the synthetic resin boxes for reception of one leg of the clip or fastener, or also achieves better flexing characteristics and less resistance to screw insertion in clips of the type heretofore provided.

Broadly described, the spring metal fastener or clip of the invention is of generally V-shaped configuration and includes a first, substantially flat or monoplanar leg joined to a second substantially monoplanar or flat leg through a bend portion defining an acute angle of from about 43° to about 48°. From about 44° to about 47° is the preferred angulation between the legs. One of the monoplanar legs of the fastener which is adapted to receive and undergo a ratcheting action upon a screw defines a centrally located circular aperture, and the second leg of the fastener or clip has a tongue or tine pressed out of a central portion of the second leg, and projecting from the plane of this second leg toward the first leg which carries the circular aperture.

The tongue which is pressed out of the second leg projects a total distance from the plane of this second leg, as measured normal to the plane of the second leg, and to include the thickness of the second leg, which is from about one-half to about two-thirds of the total distance of projection of the bend portion of the fastener from this same plane of the first leg, also as measured normal to such plane. The tongue also occupies a position with respect to the leg from which it is pressed such that its angle defined with the second leg is from about 22° to about 28°.

The importance of this dimensioning of the fastener, and particularly, the monoplanar or flat configuration of the second leg, and the tongue which is pressed therefrom for a certain distance and according to a certain geometry, is to enable the fastener to be more suitably accommodated to, and stably and tenaciously received in, the elongated slot formed in a synthetic resin box for the purpose of receiving the leg carrying the tongue. More specifically, this dimensioning and geometry are important to avoid distortion of the synthetic resin as a result of excessive pressure being exerted by the tongue against the synthetic resin when the fastener is pressed into the receiving slot, and to afford a substantially larger area of contact between the leg and one wall of the slot, thereby increasing the frictional resistance to movement of the clip or fastener relative to the slot as a screw is inserted through the hole or opening in the other leg of the fastener.

The flattening or removal of the creases or crimps from the tongue-carrying leg of the prior art fastener, which is that leg inserted in the retaining slot, is important not only to provide the enhanced or enlarged area of contact between this leg and one wall of the retaining slot, but also because the elimination of the lateral skirts or flanges outside the creases and characteristic of the prior clips described in the cited copending application avoids work hardening of the clip at and around this location. As a result of this, the flexing properties of the second leg, when engaging a screw passed through the aperture therein, are more suitable to the placement of the screw, and its long-term retention over extended periods of usage of the fastener in retaining the cover plate in position. Moreover, it is our observation that elimination of the postulated work hardening at this location greatly reduces failures of the clips or fasteners due to distortion of the second, aperture-containing leg from its intended angulation in relation to the first leg to a permanent deformation at which the second leg extends at an enlarged angle with respect to the first leg. The elimination of the crimps or bends in the first, slot-engaging leg of the clip also appears to increase the flexibility and resiliency of the tongue pressed out of the first leg, so that the tongue does not act as a rigid, unyielding column loaded in compression when the clip is pressed into position in its receiving slot, but rather can yield slightly while continuing to exert a holding bias, thereby obviating the undesirable distortion of the portions of the synthetic resin box which define the wall of the slot which is in engagement with this leg of the clip or fastener.

Certain other dimensional characteristics of the clip or fastener of the present invention are important to its proper and optimum functioning, and will be hereinafter described in detail.

It should be noted that another important aspect of the present invention is the described clip or fastener as it is used in combination with a synthetic resin electrical box having certain specific and critical dimensions determined to function with maximum advantage in conjunction with certain critical dimensions of the spring metal clip or fastener. These dimensions of the box, and the geometry of that portion of the box in which the clips or fasteners are retained, will be hereinafter described.

An important object of the present invention is to provide an improved spring metal fastener for use in conjunction with slotted synthetic resin boxes for engaging and retaining screws employed to secure a cover plate over the open side of said boxes.

A more specific object of the invention is to provide a spring metal fastener or clip which can be stably and firmly retained in accommodating slots provided in synthetic resin boxes, and particularly polyvinyl chloride boxes, where such fasteners or clips are used to engage the threads of elongated screws of uniform shank diameter, when such screws are employed to retain a cover plate over an open side of such synthetic resin boxes.

A further and additional object of the invention is to provide a spring metal fastener or clip which includes a leg having an aperture therethrough for the accommodation of the threaded shank of a screw, which leg can undergo flexing and distortion (as the screw is inserted therethrough) without permanent change of shape and distortion of the leg after undergoing elastic flexing to permit insertion of the screw and with accompanying ratcheting as the edges of the aperture through the leg slide over the ridges of the screw thread, and into the troughs of the screw thread, in alternating sequence.

A further and additional object of the present invention is to provide an improved synthetic resin box and spring metal screw-retaining fastener combination, which box has an open side adapted to be closed by cover plates secured to the box by screws extended through, and engaging, the spring metal fasteners.

In addition to the foregoing described objects and advantages of the invention, additional objects and advantages will become apparent as the following detailed description of a preferred embodiment of the invention is read in conjunction with the accompanying drawings which illustrate the invention.

GENERAL DESCRIPTION OF THE DRAWINGS

FIG. 1 is a side elevation view of a spring metal fastener constructed in accordance with the present invention and showing, by appropriate indicia, certain dimensions which are characteristic of a preferred embodiment of the invention.

FIG. 2 is a view in elevation of the spring metal fastener shown in FIG. 1, as the fastener appears when rotated through 90° from its position shown in FIG. 1, and showing the elevational appearance of one of the monoplanar legs of the fastener.

FIG. 3 is a side elevation view of the spring metal fastener shown in FIG. 1 as it appears when rotated through 90° to show, in elevation, the other of the two legs of the fastener.

FIG. 4 is a view in side elevation, with a portion broken away, of a synthetic resin electrical wall box having the spring metal fasteners of the present invention secured thereto for the purpose of receiving screws to hold a cover plate (not shown in FIG. 4) over an open side of the wall box.

FIG. 5 is a detail view, showing partly in section, the slotted portion of the electrical wall box which receives one of the spring metal fasteners, and the manner in which this fastener cooperates with a screw in holding a cover plate across the open side of the electrical wall box.

FIG. 6 is a sectional view taken along line 6—6 of FIG. 5 and showing the appearance of the spring metal fastener, screw and a portion of the electrical wall box as they appear from below.

FIG. 7 is a view similar to FIG. 6, but illustrating the appearance of the electrical wall box at the location shown in FIG. 6 at a time when neither the spring metal fastener nor the threaded screw with which it cooperates are in position. de

DETAILED DESCRIPTION OF A PREFERRED EMBODIMENT OF THE INVENTION

In the drawings, the spring metal fastener or clip of the invention is designated generally by reference numeral 10. The fastener is preferably made of a high carbon spring steel having an inherent resilient property which allows the fastener to be distorted from its geometric configuration illustrated in certain ways hereinafter described with subsequent return to the relaxed or unstressed position illustrated in the drawings. Preferably, the metal of the fastener has a hardness of from about 40–45 C Rockwell.

The fastener 10 is illustrated in FIGS. 4, 5 and 6 as it may typically appear when used in a synthetic resin wall box. Since, for a given wall box constructed in accordance with a preferred embodiment of the invention, the dimensions of certain cooperating portions of the wall box, as well as of the spring metal fastener, are critical to proper operation and functioning of the fastener, such dimensions will be hereinafter described, with it being understood that, upon scaling up or down from the particular dimensions illustrated and described, the same functions and the same efficiency can be derived from the fastener, provided ratios and relative dimensions are maintained throughout the fastener and electrical wall box construction.

The spring metal fastener 10 includes a first, substantially monoplanar leg 14 which will be hereinafter referred to, at times, as the anchor leg. In referring to FIGS. 1 and 2, it will be perceived that the anchor leg 14 of the fastener is a flat plate occupying a single plane. The fastener 10 is formed as an integral or one-piece unit from a spring metal material of the type described, and the leg 14 is formed in the shape shown by cutting or stamping, with the tongue 16 being pressed out of this leg so as to extend at an angle of from about 22° to about 28° to the plane of the leg, with an angle of extension of about 25° being preferred. It will further be noted in referring to FIGS. 1 and 2 that the tongue 16 is of rectangular shape and is bent out of the leg along a bend line 16a which extends substantially parallel to a free edge 14a of the anchor leg which terminates at its opposite ends in a pair of bias-cut angled edges 14b. The angled edges 14b intersect side edges 14c of the anchor leg 14, and the edges 14a, 14b and 14c, along with the anchor leg 14 in its entirety, lie in a common plane.

The metal plate from which the fastener is formed has a thickness of from about 0.014 inch to 0.019 inch, with 0.17 inch being the preferred thickness. It is also preferably coated with cadmium to obviate rusting.

It is important to the proper functioning of the spring metal fastener 10 of the invention that the tongue 16, in addition to being angulated in relation to the plane of the anchor leg 14 in the manner described, projects from the plane of the anchor leg 14 by a distance such that the most protuberant outer edge of the tongue is spaced a distance from the plane of the opposite or back surface of the anchor leg 14 which is between 0.61 and 0.67 inch. This dimension is illustrated in FIG. 1 of the drawings. It is also desirable that the free edge of the tongue 16 be spaced a distance of between 0.195 and 0.205 inch from the free edge 14a of the anchor leg 14, also as illustrated in FIG. 1.

It may here be pointed out that when the fastener 10 is constructed of the described material and to a Rockwell hardness of from about 40 to 45 C, and is made of spring metal having a thickness of from about 0.017 inch, the described relationship and geometry of the tongue 16 in respect to the anchor leg 14 assures that the tongue will function most effectively in retaining the fastener in a receiving slot formed in an electrical wall box in a manner hereinafter described, and, in conjunction with the flat character of the anchor leg, will prevent the fastener from being forced out of the receiving slot or recess at a time when the fastener is used for engaging a screw, also in a manner hereinafter described.

At its side which is opposite the free edge 14a, the anchor leg 14 is integrally joined as one continuous piece to a bight or bend portion 18 which interconnects the anchor leg 14 to a second monoplanar leg 20. Like the first monoplanar leg 14, the leg 20 is a flat metal plate and will be hereinafter referred to as the screw-engaging leg. The screw-engaging leg 20 has a relatively large circular opening or aperture 22 formed in the central portion thereof, and in a preferred embodiment of the invention, such central aperture or opening has a diameter of from about 0.141 inch to about 0.144 inch as shown in FIG. 3.

The bight or bend 18 joins the anchor leg 14 to the screw-engaging leg 20 in such a way that the leg 20 extends at an angle of from about 43° to about 48° with respect to the leg 14. Preferably, the acute angle defined between these legs is from 44° to 47°. It will also be noticed in referring to FIGS. 1 and 2 that the bight or bend portion 18 is of lesser width than each of the legs 14 and 20, and is formed on a radius of from about 0.035 inch to about 0.045 inch.

In order for the spring metal fastener 10 to be properly positioned, and to afford a critical interference pattern or action with respect to a screw of uniform and specific diameter extended through the opening or aperture 22 formed in the leg 20, it is important that a dimension constituted by the distance between the plane occupied by that surface of the anchor leg 14 which is remote from the leg 20 and a plane extending parallel thereto and passed tangentially to the nearest adjacent side of the hole 22 be within a certain range. This range, in a clip having the dimensions prescribed in FIGS. 1–3, is from about 0.116 inch to about 0.128 inch as shown in FIG. 1. The reason for the importance of this particular dimension will be subsequently better understood, but at this point it may be simply broadly suggested that in order for the screw-engaging leg 20 to perform properly its function of engaging a screw used to secure a cover plate across the open side of a box, a ratcheting action must take place in which the screw-engaging leg 20 first is engaged by an edge of the screw adjacent the edge of the hole or aperture 22 which is nearest the bend 18, that this leg then be deflected downwardly (or, stated differently, away from the anchor leg 14) slightly by the pressure of the screw, that the leg 20 then slip over the end of the screw, followed by a ratcheting action as the screw passes through the hole 22 and the leg moves back to a point where the opposite sides of the hole 22 engage axially spaced portions of the thread formed around the outer periphery of the screw.

It is also important to the proper functioning of the fastener of the invention to understand the proper relationship between the size and geometry of the fastener, and the distance and direction of projection of the tongue 16 from the monoplanar anchor leg 14. This tongue 16, as will be perceived in referring to FIG. 1, projects from the plane of the back or outer side of the anchor leg 14 away from this leg by a distance which is from about one-half to about two-thirds of the total distance of projection of the bight or bend portion 18 of the fastener from this same plane of the first leg as measured normal to such plane. In terms of the ratio of the distance of projection of tongue 16 out of the described plane with reference to the distance which separates this plane from the plane extending tangentially to the nearest portion of the circular perimeter of the hole 22, the tongue projection distance will generally be approximately one-half of the distance as measured between the two described parallel planes. It will also be noted that the tongue 16 extends in a plane which passes through the hole or circular aperture 22 at a location which is slightly offset from the center of this aperture in the direction of the bight or bend 18 of the fastener.

The spring metal fastener 10 is utilized, as previously discussed, for the purpose of securing a cover plate over an open side of a synthetic resin box. Such boxes and cover plates are frequently used in electrical conduit and network installations for the purpose of containing terminals, switches or the like, and are generally well understood in the art. An electrical wall box constructed of synthetic resin, and functioning for this purpose, is illustrated in FIGS. 4 and 5 and is designated generally by reference numeral 30.

The synthetic resin box 30, in the illustrated form, includes a first pair of opposed side walls, 32 and 34, and a second pair of opposed side walls 36, one of which is illustrated in section in FIGS. 6 and 7. The side walls 32–36 collectively form a box of rectangular parallelepiped configuration, which box is open at one side thereof to permit access to the hollow interior of the box. Formed midway of the two side walls 36 are a pair of semicircular cross-sectioned grooves 38 which extend from a back or bottom wall of the box toward the open front side of the box, and are designated generally by reference numeral 38. At the end of each groove 38 adjacent the open front side of the box 30 a pair of protuberant tabs 40 project outwardly from the side walls 36 and are formed integrally with the box.

Each of the tabs 40 includes an outer side 40a which has a slot 42 formed in a central portion thereof, as shown in FIGS. 5 and 6, and projecting from the lower edge of the outer side to a location near the upper end of the outer side. Each tab 40 also includes a bottom or lower side 42b which extends substantially normal to the planes of the several side walls 32, 34 and 36 of the box, and substantially parallel to the back wall and the open front side of the box. The bottom side 40a of each tab 40 has a deep slot 44 formed therein and extending upwardly in each tab as best shown in FIGS. 5, 6 and 7. The slot 44 is substantially rectangular in cross-sectional configuration and, as will be perceived in referring to FIGS. 6 and 7, intersects and communicates with the slot 42 so that the two slots conjunctively are of generally T-shaped configuration. Both the slots 42 and 44 are substantially co-extensive in length so as to terminate downwardly from the upper side of each of the tabs 40. It will be further noted in referring to FIGS. 5 and 7 of the drawings, that the slot 44 may be considered as having an outer side, which is that side immediately adjacent the slot 42, and an inner side, which is the side spaced from and extending parallel to the outer side and the slot 42. The transverse width of the slot 44 in a preferred embodiment of the invention is preferably from about 0.045 inch to about 0.55 inch. The inner side of the slot 44 carries, intermediate its overall depth, a transversely extending rib or protuberance 46 which lies immediately opposite the slot 42 in the outer side 40a of the tab, and functions as an anchoring rib or protuberance for engagement by the outer free edge of the tongue 16 as shown in FIG. 5, and as hereinafter described.

Each of the tabs 40 is further characterized in including an inner side 40c which, as shown in FIGS. 5 and 7, inclines upwardly and inwardly from its line of intersection with the lower or bottom side 40b. Generally, the angle of inclination of the plane occupied by the inner side 40c of each tab 40 with the outer side 40a thereof is from about 43° to about 48° and is thus substantially equivalent to the angle defined between the anchor leg 14 and the screw-engaging leg 20 of the spring metal fastener 10. It will further be noted that the major portion of the inner side 40c of each of the tabs 40 projects into and occupies the concavity formed by each of the inwardly turned grooves 38 in the side walls 36 of the box.

Projecting through each tab 40 between the inner side 40c and a top side 40d of each tab is a circular screw hole or passageway 50. The screw hole or passageway 50 is generally of slightly smaller diameter than the circular aperture 22 formed in the screw-engaging leg 20 of the spring metal fastener 10, and the axis of the screw hole or passageway formed in each tab 40 extends substantially parallel to the direction of extension of the slots 42 and 44 hereinbefore described. The central axis of the screw hole or passageway 50 is, in a preferred embodiment of the invention of the type here under description, spaced by a distance of from about 0.170 inch to about 0.180 inch from the plane occupied by the outer side of the slot 44 in each of the tabs 40 as such dimension is shown and illustrated in FIG. 7 of the drawings. It is important that this dimension be properly correlated to the dimensions of the spring metal fastener 10 in order that proper and efficient cooperation be attained between a screw used to secure a cover plate across the box and the spring metal fastener.

In assembling a cover plate across the open side of the box 30, a machine screw 54 of uniform diameter is employed and has a helical thread 54a formed over the length of its shank, and a head 54b formed at one end of the shank. Screws 54 are extended through holes formed in opposite sides of the cover plate 56, and the shank of each screw is substantially coaxially aligned with the axis of the respective screw hole or passageway 50 formed through each of the tabs 40. In assembling the cover 56 to the box 30, the screws are extended downwardly until the lower end thereof contacts the screw-engaging leg 20 of the spring metal fastener 10. At this time, one edge of the screw slightly contacts and interferes with the edge of the circular aperture 22 in the leg 20 which is closest the bend or bight 18 of the fastener. This results in a downward deflection of the leg 20 with continued downward pressure of the screw 54 until the screw is forced into the circular aperture 22. After this the screw-engaging leg 22 springs back due to the resiliency of the spring metal, and commences a ratcheting action as the opposite sides of the circular aperture 22 pass over the protuberant crests of the helical thread. Twisting of the screw about its axis (in a screwing action) continues this ratcheting action until the screw is fully seated in the manner shown in FIG. 5, and the screw-engaging leg 20 has been returned to its substantially normal or relaxed position, or has been pulled up slightly past this relaxed, unstressed position. As the screw is slightly tightened or torqued, a very slight distortion of the screw-engaging leg 20 in the upward direction so as to reduce the angle between this leg and the anchor leg 14 of the fastener will occur. Due to the engagement of axially spaced crests of the screw thread 54a along the shank of the screw 54 by opposite portions of the circular aperture 22 in the screw-engaging leg 20, firm retention of the closure plate 56 on the open side of the box 30 is obtained, and a tenacious and firm engagement between the fastener and the screw is effected.

As has been previously indicated, the relative dimensions and the geometry which have been discussed as characteristic of the tabs 40 and the construction of the spring metal fastener 10 are important features of the present invention, and have been found to be needed in order to permit the fasteners to function effectively in retention of the screws over extended operating periods, and without failure or malfunction at a time when it is initially undertaken to insert the screws into their engaging and holding positions.

It will be perceived that as the fasteners 10 are inserted into the slots 44, they are pressed into these slots so that the tongue 16 of each fastener bears at its outer free edge against the inner wall of the respective slot 44, and is abutted against the rib or protuberance 46. It will also be noted that the flat or monoplanar surface of the outer side of the anchor leg 14 bears flatly and over a large surface area against the outer side of slot 44 and bridges across the intersecting slot 42. In other words, the full surface area of the monoplanar anchor leg 14 is in contact with an equivalent surface area on the outer side of the slot 44 in the respective tab 40 in which each fastener is located. This relationship is very important to the proper functioning of the invention. In forming the anchor leg 14 in a flat or monoplanar configuration, assurance is gained that the optimum flexibility will be characteristic of the bight or bend portion 18, and also that maximum tightness of the leg 14 and tongue 16 in the slot 44 over extended periods of usage will be achieved without distortion of the synthetic resin of the box where it defines the slot 44, and relatively early loosening of the fastener in this slot.

Although a preferred embodiment of the invention has been herein described in order to clearly illustrate the parameters which are important in the construction of the spring metal fastener of the invention and the principles of operation of the invention, it is to be understood that some changes and innovations can be made in the box assembly, and particularly, in the spring metal fastener, without departure from the basic principles underlying the invention. For example, even though one type of electrical wall box has been illustrated in the drawings in combination with the fastener of the invention, other types and shapes of boxes, such as round boxes, can be so utilized, and the slots which receive the fasteners can be slightly changed in their particular mode of formation and location in the box. Thus, such slots might be formed in the thickened walls of various shapes of boxes, or the slot 42 could be omitted, or the tabs 40 could actually be made protuberant from flat box side walls having no indentations or concave grooves of the sort shown in the box here illustrated. All innovations of this type, which do not depart from the basic principles of the invention as herein described, are considered to be circumscribed by the spirit and scope of the invention, except as the same may be necessarily limited by the appended claims or reasonable equivalents thereof.

What is claimed is:

1. A spring metal fastener of generally V-shaped configuration comprising:
 a first flat, crimp-free, substantially monoplanar leg having edges around the periphery thereof lying in a common plane;
 a second flat, substantially monoplanar leg having an opening formed therethrough and disposed centrally therein;
 a bend portion joining one end of said first leg to one end of said second leg and reverse bent through an angle of from about 132° to about 137° to define an acute angle between said first and second legs of from about 43° to about 48°; and
 a tongue pressed out of the central portion of said first leg and projecting in a plane which extends toward said second leg at an acute angle to the plane of said first leg, said tongue projecting a distance from the plane of said first leg, as measured normal to that plane, which is from about one-half to about two-thirds of the total distance of projection of said bend portion from the plane of said first leg, also as measured normal to the plane of said first leg.

2. A spring metal fastener as defined in claim 1 where said tongue is substantially rectangular in shape, and has a free edge extending parallel to the planes of said first and second legs.

3. A spring metal fastener as defined in claim 1 wherein said fastener is formed from a spring metal sheet having a thickness of about 0.017 inch, and said metal has a hardness of from about 40 to about 45C Rockwell.

4. A spring metal fastener of generally V-shaped configuration comprising:
 a first flat, crimp-free, substantially monoplanar leg having edges around a portion of said monoplanar leg lying in a common plane with the remainder of said monoplanar leg;
 a second flat, substantially monoplanar leg having an opening formed therethrough and disposed centrally therein;
 a bend portion joining one end of said first leg to one end of said second leg and reverse bent through an angle exceeding 90° so as to define an acute angle between said first and second legs of from about 43° to about 48°; and
 a tongue pressed out of a central portion of said first leg and projecting toward said second leg in a plane which extends toward said second leg and at an acute angle to the plane of said first leg, said tongue projecting a distance from the plane of said fist leg, as measured normal to that plane, which is from about one-half to about two-thirds of the total distance of projection of said bend portion from the plane of said first leg, also as measured normal to the plane of said first leg, said described distances in said ratio including the dimension of the thickness of said first leg.

5. In combination,
 a synthetic resin box having wall means defining a hollow interior and defining an opening at one side of said box, said wall means defining a slot adjacent said opening at one side of said box and further defining an elongated screw passageway having an axis extending parallel to said slot, a portion of said wall means separating said slot from said passageway; and
 a spring metal fastener mounted in said wall means and including;
  a first flat, crimp-free, substantially monoplanar leg having free side edges lying in a common plane with the remainder of said leg and positioned in said slot with the plane thereof extending substantially parallel to the axis of said elongated screw passageway, and with one flat side of said first leg bearing against one side of said slot;
  a tongue pressed out of said first leg at an acute angle to the plane thereof and resiliently bearing against the second side of said slot;
  a second flat, substantially monoplanar leg having a central opening therethrough, which opening has its center aligned with the axis of said elongated screw passageway; and
  a bend portion joining one end of said first leg to one end of said second leg and reverse bent through an angle of from about 132° to about 137° to define an acute angle between said legs of from about 43° to about 48°, said bend portion bridging across said portion of said wall means separating said slot from said passageway.

6. The combination defined in claim 5 and further characterized as including a screw having an elongated threaded shank positioned in said screw passageway and extending through the central opening in said second monoplanar leg with the threads on said screw shank engaged by the portions of said leg defining the central opening therethrough at points spaced axially along said threaded screw shank.

7. In combination, a synthetic resin box having a wall extending around and defining a hollow interior, and further defining an opening at one side of said box;
 synthetic resin slot-defining means formed integrally with said wall, and positioned adjacent said opening at one side of said box, and further defining, in addition to a slot, an elongated screw passageway, said slot and said screw passageway having axes which extend substantially parallel to each other, said slot-defining means including a synthetic resin portion separating said slot from said elongated screw passageway; and
 an abutment rib of synthetic resin formed integrally with said box and positioned on one side of said slot intermediate the length of said slot, said one side of the slot being that side of the slot which is nearest the hollow interior of the box; and
 a spring metal fastener mounted in said slot-defining means and including:
  a first flat, substantially monoplanar leg position in said slot with the plane thereof extending substantially parallel to the axis of said elongated screw passageway, said first flat leg having a surface at one side thereof bearing flatly against a flat surface of said slot-defining means forming the opposite side of said slot from the side upon which said abutment rib is located;
  a tongue projecting out of said first leg from a central portion thereof at an acute angle to the plane thereof, said tongue having an edge at the outer end thereof spaced from the plane of said first leg, and bearing against said abutment rib, said tongue further resiliently bearing against the side of said slot upon which said abutment rib is located;
  a second flat, substantially monoplanar leg having a central opening therethrough aligned with said elongated screw passageway; and a bend portion joining one end of said first leg to one end of said leg so that said tongue extends from said first leg in the direction of said second leg, and said first and second legs define between them an acute angle of from about 43° to about 48°, said bend portion bridging across said synthetic resin portion of said slot-defining means separating said slot from said passageway.

8. The combination defined in claim 7 wherein said tongue extends from said fist leg to define therewith, an acute angle of from about 22° to about 28°.

9. The combination defined in claim 7 wherein said slot has a transverse dimension, as measured from the wall thereof upon which said abutment rib is located to the opposite wall against which a surface of said first leg bears flatly, which is from about 0.20 inch to about 0.30 inch, and said tongue projects from the plane of said first leg of said fastener, as measured normal to such plane, which is a distance of from about 0.061 inch to about 0.067 inch.

10. The combination defined in claim 7 wherein the distance from the side of said slot opposite the side thereof at which said rib is located, to a plane extended through the center of the opening in said second leg and parallel to the plane of said opposite slot side from which said distance is measured, is from about 0.180 inch to about 0.170 inch.

11. the combination defined in claim 7 wherein the ratio of the width of said slot, as measured from the wall having said rib disposed thereon to the opposite wall directly across said slot, to the distance measured from the outer free edge of said tongue to said surface of said first leg which bears flatly against a flat surface of said slot-defining means is from about 9:13 to about 11:13.

12. An electrical fixture structure comprising:
a synthetic resin box having side walls, a back wall and an open front;
synthetic resin tabs formed integrally with at least two of said side walls adjacent said opening and on opposite sides thereof, each of said tabs defining a fastener-receiving slot extending substantially parallel to the respective side wall carrying the respective tab and spaced from said respective side wall, each of said tabs further defining a screw passageway between said slot and said respective side wall;
a closure plate extending across the open front of said box and having screw-openings therethrough aligned with the screw passageways defined by said tabs;
screws each having a threaded shank of uniform diameter and each extended through one of said screw holes with the respective shank of each screw at least partially positioned in one of said screw passageways; and
spring metal fasteners secured to said box and engaging said screws to retain said closure plate across the open front of said box, each of said spring metal fasteners comprising:
a flat, crimp-free anchor leg pressed into one of said slots and including a monoplanar surface surrounded by side edges at one side of said anchor leg with said side edges being positioned in the same plane as the remainder of said monoplanar surface, said monoplanar surface bearing flatly against an abutting flat surface of the synthetic resin tab which defines the respective slot;
a tongue projecting out of the flat anchor leg and against the side of said slot opposite said abutting flat surface; and
a screw-engaging leg joined to said anchor leg in end-to-end relation to define a V-configuration, said screw-engaging leg having an aperture disposed substantially centrally therein and having the metal at the perimeter of the aperture and on opposite sides of the aperture extending into valleys between the crests of the screw thread at points of contact spaced axially along the shank of the screw.

* * * * *